(12) United States Patent
Vanderveen et al.

(10) Patent No.: US 8,978,113 B2
(45) Date of Patent: Mar. 10, 2015

(54) ALLOCATION OF IDENTIFIERS FOR APPLICATION DISCOVERY

(75) Inventors: Michaela Vanderveen, Tracy, CA (US); Georgios Tsirtsis, London (GB); Vincent D. Park, Budd Lake, NJ (US); Mathew Scott Corson, Gillette, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 1092 days.

(21) Appl. No.: 12/977,717

(22) Filed: Dec. 23, 2010

(65) Prior Publication Data

US 2012/0167184 A1 Jun. 28, 2012

(51) Int. Cl.
| | |
|---|---|
| H04L 29/06 | (2006.01) |
| H04W 12/06 | (2009.01) |
| H04L 29/12 | (2006.01) |
| H04L 29/08 | (2006.01) |
| H04W 8/26 | (2009.01) |
| H04W 84/12 | (2009.01) |
| H04W 84/18 | (2009.01) |
| H04W 92/18 | (2009.01) |

(52) U.S. Cl.
CPC ......... *H04W 12/06* (2013.01); *H04L 29/12028* (2013.01); *H04L 29/12367* (2013.01); *H04L 29/12377* (2013.01); *H04L 29/12433* (2013.01); *H04L 61/103* (2013.01); *H04L 61/2514* (2013.01); *H04L 61/2517* (2013.01); *H04L 61/2539* (2013.01); *H04L 67/1046* (2013.01); *H04L 63/164* (2013.01); *H04L 63/166* (2013.01); *H04L 29/12981* (2013.01); *H04L 61/609* (2013.01); *H04W 8/26* (2013.01); *H04W 84/12* (2013.01); *H04W 84/18* (2013.01); *H04W 92/18* (2013.01)
USPC .................................................. 726/5; 726/9

(58) Field of Classification Search
None
See application file for complete search history.

(56) References Cited

U.S. PATENT DOCUMENTS 8,255,684 B2 * 8/2012 Benshetler et al. ........... 713/156
8,578,465 B2 * 11/2013 Xiao et al. ...................... 726/10

(Continued)

FOREIGN PATENT DOCUMENTS

JP 2005319047 A 11/2005
WO WO-2007082252 A1 7/2007

(Continued)

OTHER PUBLICATIONS

International Search Report and Written Opinion—PCT/US2011/065264—ISA/EPO—Apr. 24, 2012.

*Primary Examiner* — Saleh Najjar
*Assistant Examiner* — William G O'Hara
(74) *Attorney, Agent, or Firm* — James K. O'Hare

(57) ABSTRACT

An apparatus, a method, and a computer program product of a wireless device are provided in which a first device identifier of a wireless device is provided. An allocation record is received that includes an expression used for discovery, a second device identifier, and at least one of a digital signature of a first server that delegates the expression or a digital signature of a second server that manages the expression. The allocation record is verified. An apparatus, a method, and a computer program product of a first server are provided in which a device identifier is received from a wireless device. An allocation record is generated that includes an expression used for discovery, the device identifier, and at least one of a digital signature of the first server or a digital signature of a second server that manages the expression. The allocation record is sent.

56 Claims, 8 Drawing Sheets

(56) References Cited

U.S. PATENT DOCUMENTS

| | | |
|---|---|---|
| 8,750,261 B2 | 6/2014 | Li et al. |
| 2004/0019696 A1 | 1/2004 | Scott et al. |
| 2007/0067385 A1 | 3/2007 | D'Angelo et al. |
| 2008/0039008 A1 | 2/2008 | Chen et al. |
| 2008/0040490 A1 | 2/2008 | Karlberg |
| 2009/0094673 A1* | 4/2009 | Seguin et al. .................... 726/1 |
| 2010/0056127 A1 | 3/2010 | Osborne et al. |
| 2010/0063867 A1 | 3/2010 | Proctor, Jr. et al. |
| 2010/0161817 A1 | 6/2010 | Xiao et al. |
| 2011/0283347 A1* | 11/2011 | Bhuta et al. ...................... 726/9 |
| 2013/0074144 A1* | 3/2013 | Narayanaswamy et al. ...... 726/1 |

FOREIGN PATENT DOCUMENTS

| | | |
|---|---|---|
| WO | WO-2010075338 A2 | 7/2010 |
| WO | WO2011074955 A1 | 6/2011 |

* cited by examiner

ALLOCATION OF IDENTIFIERS FOR APPLICATION DISCOVERY

BACKGROUND

1. Field

The present disclosure relates generally to communication systems, and more particularly, to allocation of application identifiers.

2. Background

Application identifiers are expressions associated with applications that run on wireless devices. The expressions are broadcasted to allow other applications to discover each other. The expressions should be unique. An allocated expression has to be verifiable by a third party in order to be usable in a secure manner. An efficient method for the third-party verifiable allocation is needed.

SUMMARY

In an aspect of the disclosure, an apparatus, a method, and a computer program product of a wireless device are provided in which a first device identifier of a wireless device is provided. In addition, an allocation record is received that includes an expression used for discovery, a second device identifier, and at least one of a digital signature of a first server that delegates the expression or a digital signature of a second server that manages the expression. Furthermore, the allocation record is verified.

In an aspect of the disclosure, an apparatus, a method, and a computer program product of a first server are provided in which a device identifier is received from a wireless device. In addition, an allocation record is generated that includes an expression used for discovery, the device identifier, and at least one of a digital signature of the first server or a digital signature of a second server that manages the expression. Furthermore, the allocation record is sent.

DETAILED DESCRIPTION

Figure 1:
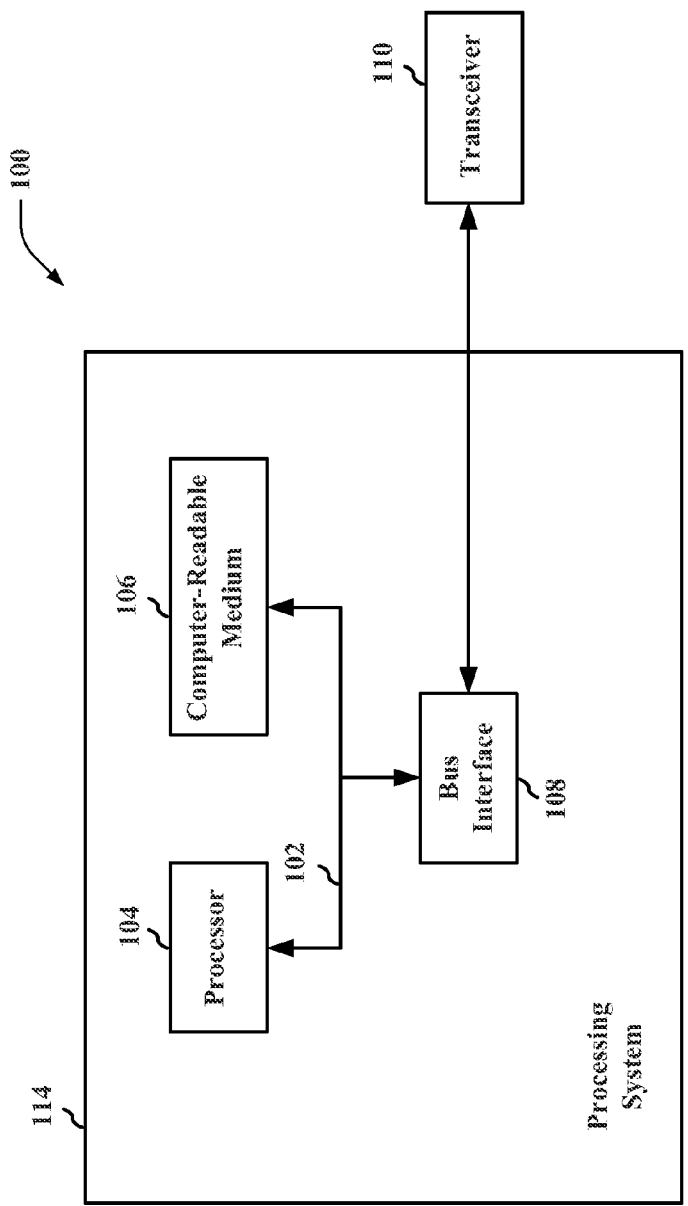
FIG. 1 is a diagram illustrating an example of a hardware implementation for an apparatus employing a processing system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of communication systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

FIG. 1 is a conceptual diagram illustrating an example of a hardware implementation for an apparatus 100 employing a processing system 114. The processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatuses over a transmission medium.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

Figure 2:
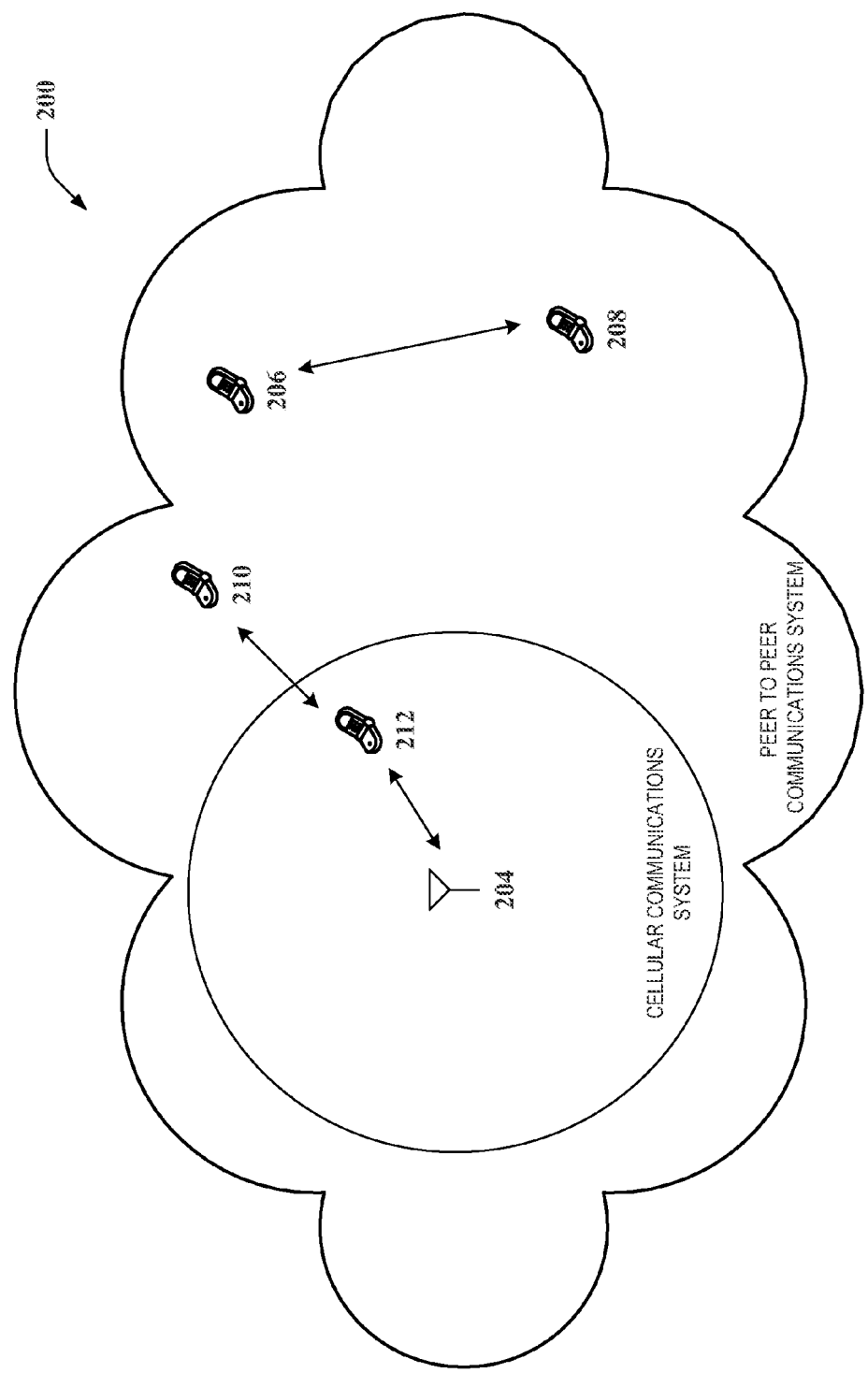
FIG. 2 is a drawing of a wireless peer-to-peer communications system.

FIG. 2 is a drawing of an exemplary peer-to-peer communications system 200. The peer-to-peer communications system 200 includes a plurality of wireless devices 206, 208, 210, 212. The peer-to-peer communications system 200 may overlap with a cellular communications system, such as for example, a wireless wide area network (WWAN). Some of the wireless devices 206, 208, 210, 212 may communicate together in peer-to-peer communication, some may communicate with the base station 204, and some may do both. For example, as shown in FIG. 2, the wireless devices 206, 208 are in peer-to-peer communication and the wireless devices 210, 212 are in peer-to-peer communication. The wireless device 212 is also communicating with the base station 204.

The wireless device may alternatively be referred to by those skilled in the art as user equipment, a mobile station, a subscriber station, a mobile unit, a subscriber unit, a wireless unit, a wireless node, a remote unit, a mobile device, a wireless communication device, a remote device, a mobile subscriber station, an access terminal, a mobile terminal, a wireless terminal, a remote terminal, a handset, a user agent, a mobile client, a client, or some other suitable terminology. The base station may alternatively be referred to by those skilled in the art as an access point, a base transceiver station, a radio base station, a radio transceiver, a transceiver function, a basic service set (BSS), an extended service set (ESS), a Node B, an evolved Node B, or some other suitable terminology.

The exemplary methods and apparatuses discussed infra are applicable to any of a variety of wireless peer-to-peer communications systems, such as for example, a wireless peer-to-peer communication system based on FlashLinQ, WiMedia, Bluetooth, ZigBee, or Wi-Fi based on the IEEE 802.11 standard. To simplify the discussion, the exemplary methods and apparatus are discussed within the context of FlashLinQ. However, one of ordinary skill in the art would understand that the exemplary methods and apparatuses are applicable more generally to a variety of other wireless peer-to-peer communication systems.

Figure 3:
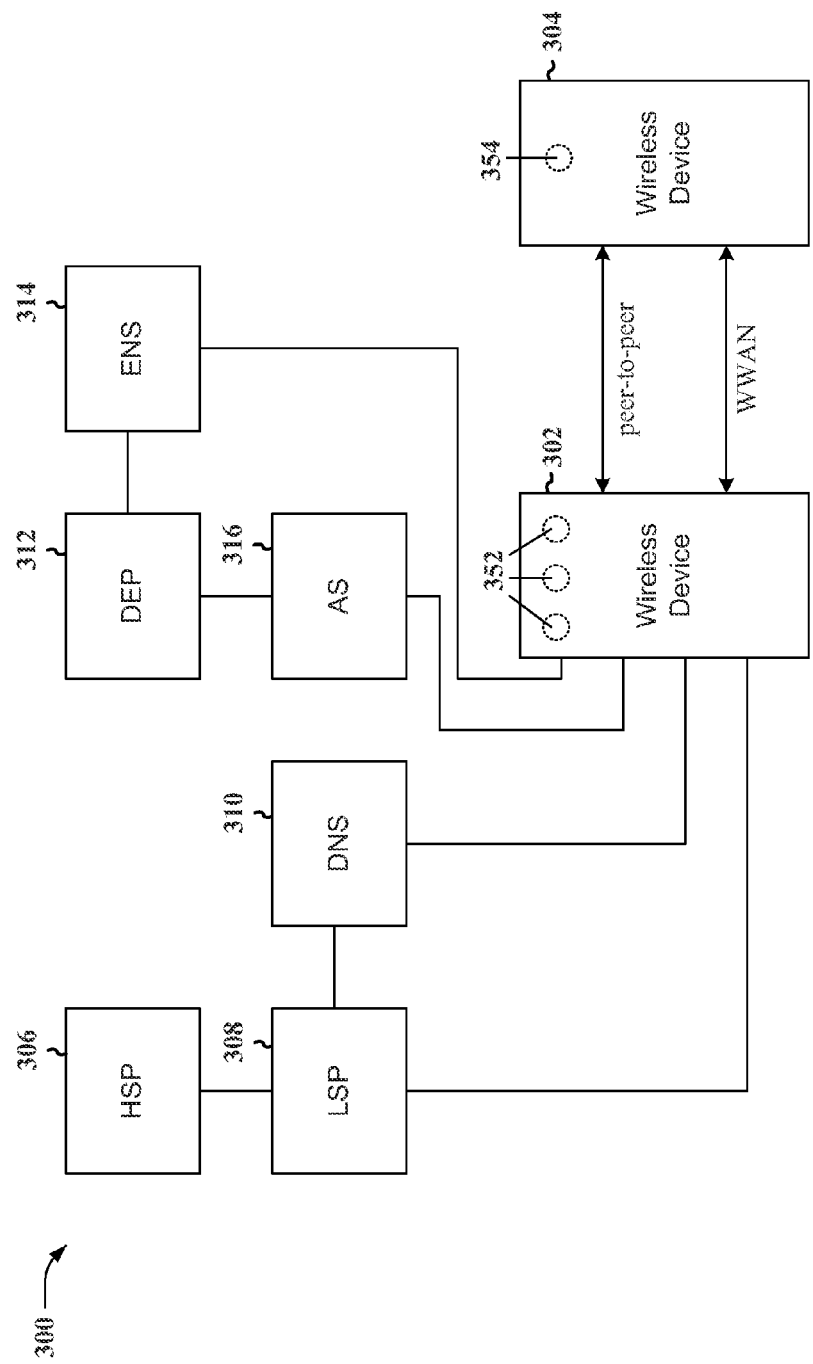
FIG. 3 is a diagram illustrating a system architecture for wireless peer-to-peer communications system.

FIG. 3 is a diagram illustrating a system architecture 300 for a wireless peer-to-peer communications system. As shown in FIG. 3, the wireless device 302 may communicate with the wireless device 304 directly through peer-to-peer communication or indirectly through a base station using WWAN communication. On each of the wireless devices 302, 304, applications may be active. For example, a plurality of applications 352 are running on the wireless device 302 and an application 354 is running on the wireless device 304. Each of the applications may be associated with a unique application identifier. An application identifier is an expression. An expression is referred to as "direct" if there is no privacy restriction on its discoverability. Direct expressions are strings that are broadcasted to allow applications to discover each other so that they may communicate together through peer-to-peer and/or WWAN communication. As such, direct expressions may be any application-defined information string, such a location, a service, or otherwise an identifier associated with a particular application running on a wireless device. Each direct expression may have a shorter form code representation. The code representation is referred to as a direct expression code.

The wireless device 302 receives an allocation of individual direct expressions from the Allocation Server (AS) 316. The AS may also be referred to as an Application Specific Allocator (ASA). A system may contain a plurality of ASAs. There may be multiple ASs 316, all of which coordinate together to allocate unique direct expressions. The AS 316 is coupled to the Direct Expression Provider (DEP) 312. The DEP 312 manages direct expression name and code spaces and allocates blocks of direct expression codes to the AS 316. The wireless device 302 and the DEP 312 may obtain a mapping between any direct expression name and direct expression code from the Expression Name System (ENS) 314, which maintains a repository of mappings between direct expression names and codes.

The Home Service Provider (HSP) 306 authenticates and authorizes the wireless device 302 to use the subscription service. The Local Spectrum Provider (LSP) 308 enables the wireless device 302 to access the radio spectrum in a given area by providing the wireless device 302 authorizing information. The LSP 308 is coupled to the Domain Name Server (DNS) 310, which maintains DNS records so that wireless devices may look up an Internet Protocol (IP) address associated with a direct expression.

Figure 4:
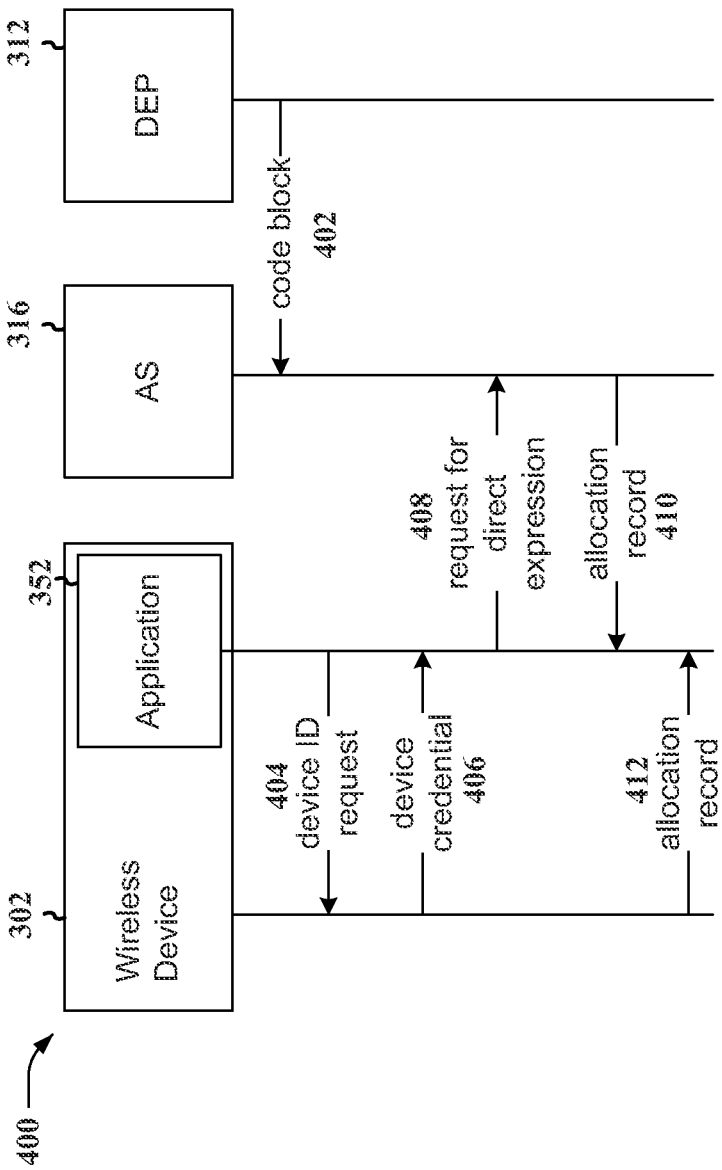
FIG. 4 is a diagram for illustrating an exemplary method.

FIG. 4 is a diagram 400 for illustrating an exemplary method. As discussed supra, application identifiers are expressions of entities, services, locations, or other information associated with an application. Expressions can be used by applications to discover other applications in geographic proximity, according to user-defined or prescribed interests and preferences. Each expression must have a unique name, distinct from other (related) expressions. The AS 316 may coordinate with other ASs in order to allocate individual direct expressions that satisfy the uniqueness requirement. An allocated direct expression has to be verifiable by a third party in order to be usable in a secure manner. FIG. 4 illustrates an efficient method for the third-party verifiable allocation. As shown in FIG. 4, the AS 316 receives a set (block) of direct expression codes 402 from the DEP 312. The set includes one or more direct expression codes that may be allocated by the AS 316. An application 352 running on the wireless device 302 may request a unique device identifier (e.g., media access control (MAC) identifier) 404 and obtain a device credential 406 from the wireless device 302. The device credential may be an X.509 v3 digital certificate that includes the device identifier of the wireless device 302. When the application 352 desires a direct expression to use for discovery, the application 352 requests a direct expression 408 from the AS 316 and provides the AS 316 with the device credential. The AS 316 generates an allocation record that includes the device identifier and sends the allocation record 410 to the application 352. The wireless device 302 receives the allocation record 412 and verifies the allocation record. If the allocation record is verified, the application is allowed to utilize the allocated direct expression. If the allocation record is unable to be verified, the application is not allowed to utilize the allocated direct expression.

The allocation record may include the following information:
- Direct Expression Name
- Direct Expression Code
- Direct Expression Lifetime
- Device Identifier
- Application Identity
- DEP Record
  - Direct Expression Code Block
  - AS Identifier
  - AS Public Key
  - Block Lifetime
  - DEP Public Key
  - DEP Signature
- AS Public Key
- AS Signature The direct expression name is a string of the direct expression. The direct expression code is the coded form of the direct expression name. The direct expression lifetime is the time period in which the direct expression name is valid. The device identifier is a unique identifier associated with the wireless device, such as for example, the MAC address of the wireless device. The application identity is an identity associated with the application and may optionally be included in the allocation record. The DEP record is the record that the AS 316 received from the DEP 312. The DEP record includes the direct expression code block allocated to the AS 316, an identifier identifying the AS that received the DEP record, a public key of the AS 316, the lifetime in which the direct expression code block may be validly allocated, a public key of the DEP 312, and a signature of the DEP 312. Each public key, such as the AS public key and the DEP public key, may be a link or pointer to the respective published public key.

Using the public key of the AS 316, a wireless device 302 that receives the allocation record is able to verify the authenticity of the allocation record and the signature of the AS 316. As such, the wireless device 302 can ascertain that the received allocation record was created by the AS 316 and that the allocation record has remained unchanged after creation. The wireless device 302 may also verify that the allocation record was intended for itself by determining whether the device identifier in the allocation record matches its own device identifier. The wireless device 302 may also determine whether the lifetime is still valid given the current date and time.

Using the public key of the DEP 312, the wireless device 302 may also verify the authenticity of the DEP record and the signature of the DEP 312. As such, the wireless device 302 can ascertain that the DEP record was created by the DEP 312 and that the DEP record has remained unchanged after creation. The wireless device 302 may also verify that the allocated direct expression is included in the direct expression code block of the DEP record and that the AS identifier and AS public key matches that of the AS 316 and therefore that the DEP record was intended for the AS 316. The wireless device 302 may also verify that the block lifetime is still current. The block lifetime may have a lifetime equal or greater than the direct expression lifetime.

Figure 5:
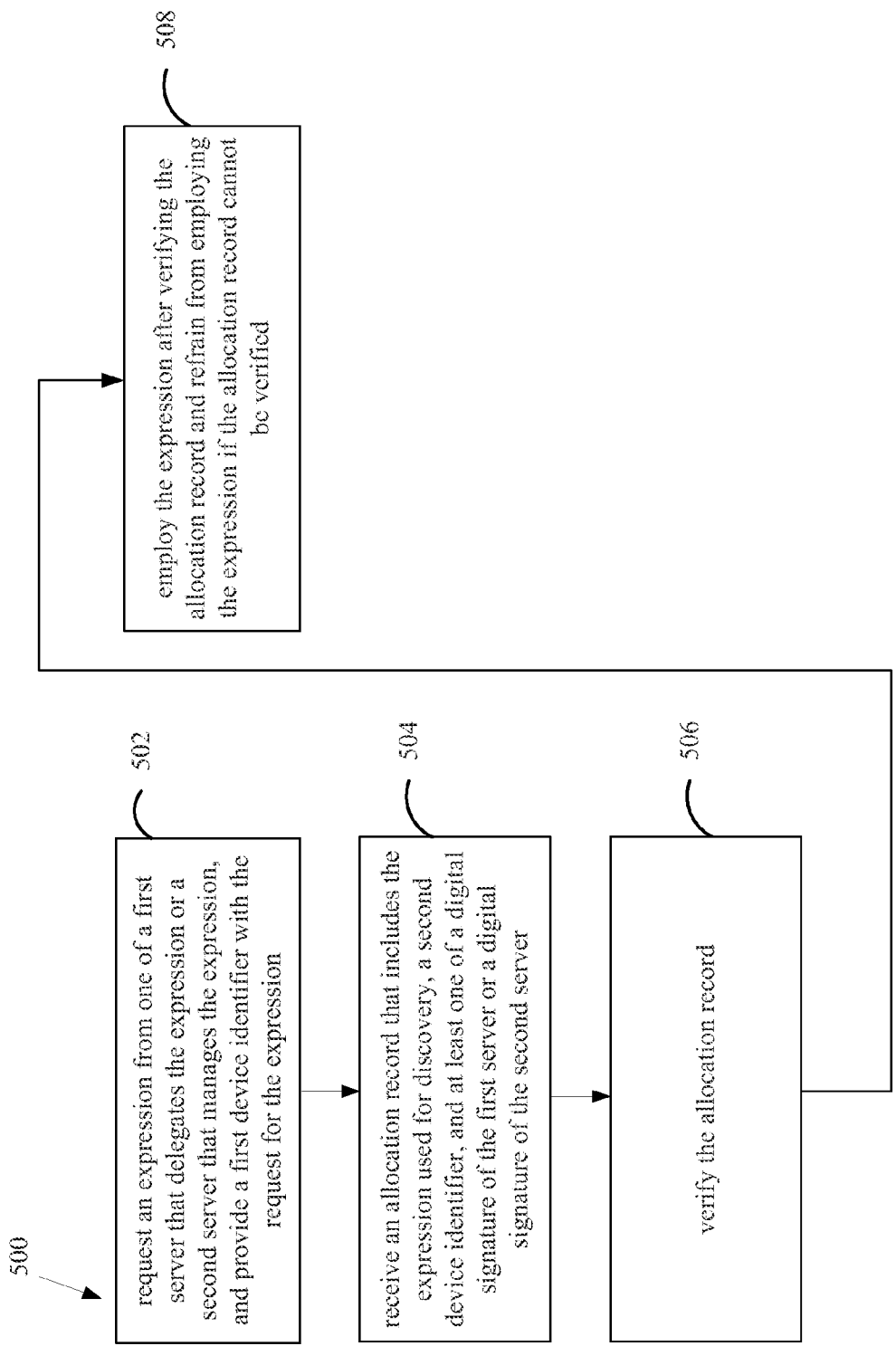
FIG. 5 is a flow chart of a method of operating a wireless device.

FIG. 5 is a flow chart 500 of an exemplary method. The method is performed by the wireless device 302. As shown in FIG. 5, the wireless device 302 requests an expression from one of the first server that delegates the expression (e.g., the AS 316) or the second server that manages the expression (e.g., the DEP 312) and provides the device identifier with the request for the expression (502). The device identifier may be provided by sending a device credential such as an X.509 v3 digital certificate that includes the device identifier to the AS 316. The wireless device 302 receives an allocation record that includes the expression used for discovery, a second device identifier, and at least one of a digital signature of the first server or a digital signature of the second server (504). The wireless device 302 verifies the allocation record (506). The wireless device 302 employs the expression after verifying the allocation record (508) and refrains from employing the expression if the allocation record cannot be verified (508).

As discussed supra, the allocation record may further include a lifetime in which the allocation record is valid. In such a configuration, the wireless device 302 verifies the allocation record by verifying the digital signatures of the first and second servers that are included in the allocation record, verifying that the second device identifier is the same as the first device identifier, and verifying the lifetime is valid given the current time. The wireless device 302 refrains from employing the expression if either of the digital signatures cannot be verified, the second device identifier is different from the first device identifier, or the lifetime is invalid. The request may be for a particular expression. The first server and the second server may be the same server. Alternatively, the first server and the second server may be different. When the first and second severs are different, the first server may be the AS 316 and the second server may be the DEP 312. In one configuration, the wireless device 302 requests the expression from the first server. In such a configuration, the allocation record may further include an expression name, a lifetime in which the allocation record is valid, a record of the second server, and information related to a certificate of the first server. The record of the second server may include a set of expressions delegated by the first server, an identifier of the first server, a lifetime of the set of expressions, and information related to a certificate of the second server. The information related to a certificate of the first server may be a pointer, link, certificate, and/or selected fields from the certificate such as an identifier/name/public key of the first server. The information related to a certificate of the second server may be a pointer, link, certificate, and/or selected fields from the certificate such as an identifier/name/public key of the second server.

Figure 6:
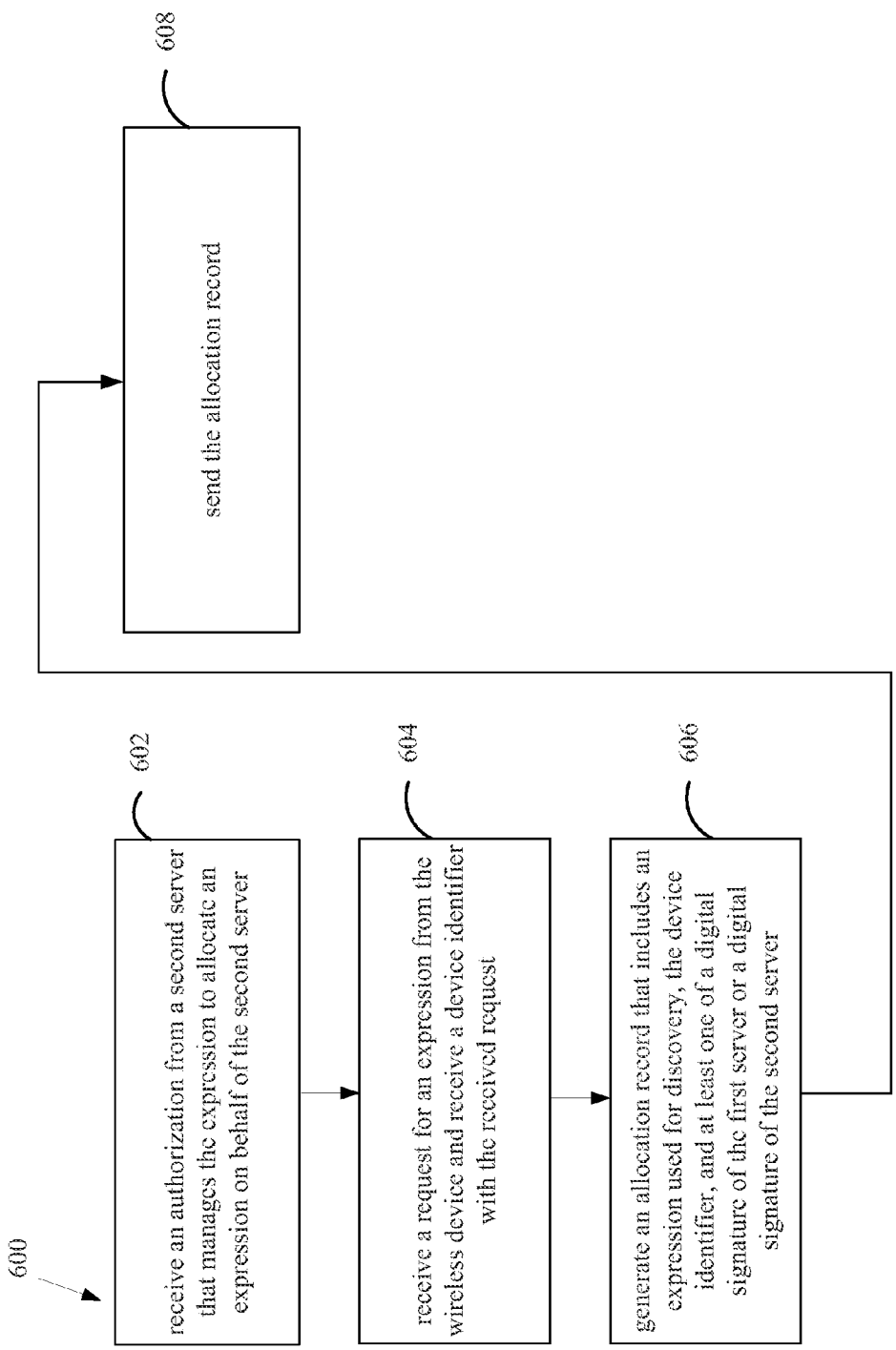
FIG. 6 is a flow chart of a method of operating a server for allocating direct expressions.

FIG. 6 is a flow chart 600 of an exemplary method. The method is performed by the AS 316. As shown in FIG. 6, the AS 316 receives an authorization from a second server that manages the expressions (e.g., DEP 312) to allocate the expression on behalf of the second server (602). The authorization is the DEP record. The AS 316 receives a request for an expression from the wireless device 302 (604). A device identifier is received with the received request (604). The device identifier may be received in a device credential, which may be an X.509 v3 digital certificate through which the AS 316 can verify that the received device identifier belongs to the requesting wireless device. The AS 316 generates an allocation record that includes the expression used for discovery, the device identifier, and at least one of a digital signature of the first server or a digital signature of the second server (606). The AS 316 sends the allocation record to the wireless device 302 (608).

The request may be for a particular expression. The allocation record may further include an expression name, a lifetime in which the allocation record is valid, a record of the second server, and information related to a certificate of the first server. The record of the second server may include a set of expressions delegated by the first server, an identifier of the first server, a lifetime of the set of expressions, information related to a certificate of the second server, and a digital signature of the second server. The information related to a certificate of the second server may be a pointer, link, certificate, and/or selected fields from the certificate such as an identifier/name/public key of the second server.

Figure 7:
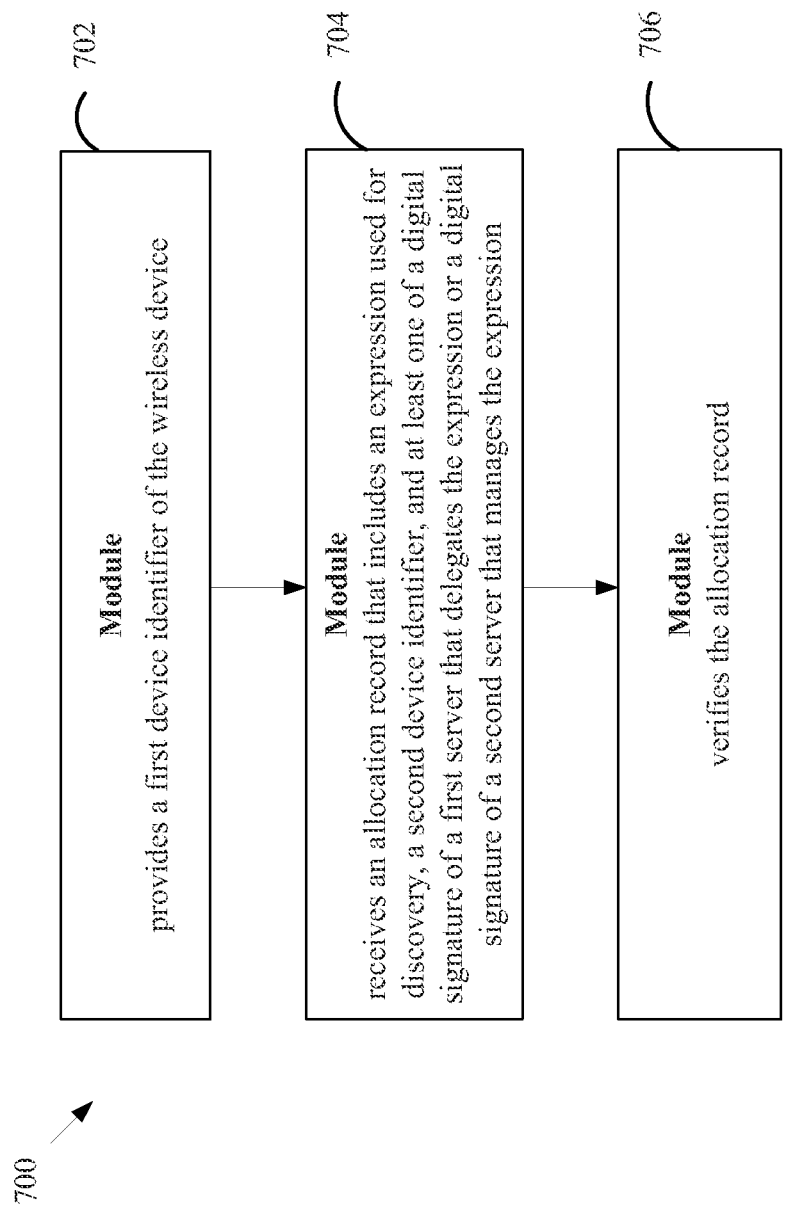
FIG. 7 is a conceptual block diagram illustrating the functionality of a first exemplary apparatus.

FIG. 7 is a conceptual block diagram 700 illustrating the functionality of an exemplary apparatus 100, which may be a wireless device 302. The apparatus 100 includes a module 702 that provides a first device identifier of the wireless device. In addition, the apparatus 100 includes a module 704 that receives an allocation record that includes an expression used for discovery, a second device identifier, and at least one of a digital signature of a first server that delegates the expression or a digital signature of a second server that manages the expression. Furthermore, the apparatus 100 includes a module 706 that verifies the allocation record.

Figure 8:
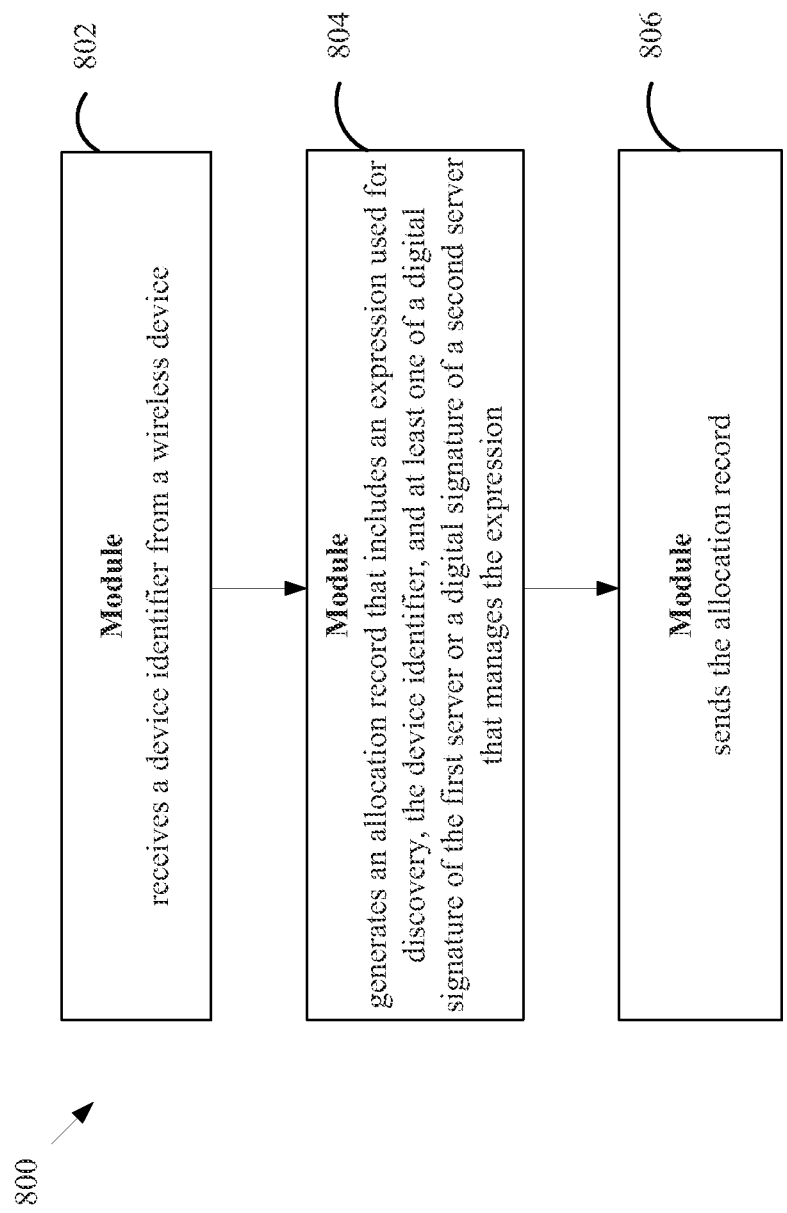
FIG. 8 is a conceptual block diagram illustrating the functionality of a second exemplary apparatus.

FIG. 8 is a conceptual block diagram 800 illustrating the functionality of an exemplary apparatus 100, which may be an AS 316. The apparatus 100 includes a module 802 that receives a device identifier from a wireless device 302. In addition, the apparatus 100 includes a module 804 that generates an allocation record that includes an expression used for discovery, the device identifier, and at least one of a digital signature of the first server or a digital signature of a second server that manages the expression. Furthermore, the apparatus 100 includes a module 806 that sends the allocation record to the wireless device 302.

Referring to FIG. 1, in one configuration, the apparatus 100 for wireless communication is a wireless device 302 and includes means for providing a first device identifier of the apparatus. In addition, the apparatus 100 includes means for receiving an allocation record that includes an expression used for discovery, a second device identifier, and at least one of a digital signature of a first server that delegates the expression or a digital signature of a second server that manages the expression. Furthermore, the apparatus 100 includes means for verifying the allocation record. The apparatus 100 may further include means for employing the expression after verifying the allocation record. The apparatus 100 may further include means for refraining from employing the expression if the allocation record cannot be verified. In one configuration, the allocation record further includes a lifetime in which the allocation record is valid, and the means for verifying the allocation record includes means for verifying the digital signatures of the first and second servers that are included in the allocation record, means for verifying that the second device identifier is the same as the first device identifier, and means for verifying the lifetime is valid given a current time. The apparatus 100 may further include means for refraining from employing the expression if either of the digital signatures cannot be verified, the second device identifier is different from the first device identifier, or the lifetime is invalid. The apparatus 100 may further include means for requesting the expression from one of the first server or the second server, the device identifier being provided with the request for the expression. The aforementioned means is the processing system 114 configured to perform the functions recited by the aforementioned means.

In another configuration, the apparatus 100 for wireless communication is an AS 316 and includes means for receiving a device identifier from a wireless device. In addition, the apparatus 100 includes means for generating an allocation record that includes an expression used for discovery, the device identifier, and at least one of a digital signature of the apparatus or a digital signature of a second apparatus that manages the expression. Furthermore, the apparatus 100 includes means for sending the allocation record. The apparatus 100 may further include means for receiving a request for an expression from the wireless device, wherein the device identifier is received through the received request. The apparatus 100 may further include means for receiving an authorization from the second apparatus to allocate the expression on behalf of the second apparatus. The aforementioned means is the processing system 114 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of operating a wireless device, comprising:
   providing a first device identifier of the wireless device;
   receiving an allocation record that includes an expression used for discovery and for identifying an application on the wireless device, a second device identifier, and at least one of a digital signature of a first server that delegates the expression or a digital signature of a second server that manages the expression; and
   verifying the allocation record by at least verifying that the second device identifier is the same as the first device identifier.

2. The method of claim 1, further comprising employing the expression after verifying the allocation record.

3. The method of claim 1, further comprising refraining from employing the expression if the allocation record cannot be verified.

4. The method of claim 1, wherein the allocation record further comprises a lifetime in which the allocation record is valid, and the verifying the allocation record further comprises:
   verifying the digital signatures of the first and second servers that are included in the allocation record; and
   verifying the lifetime is valid given a current time.

5. The method of claim 4, further comprising refraining from employing the expression if either of the digital signatures cannot be verified, the second device identifier is different from the first device identifier, or the lifetime is invalid.

6. The method of claim 1, further comprising requesting the expression from one of the first server or the second server, the device identifier being provided with the request for the expression.

7. The method of claim 6, wherein the request is for a particular expression.

8. The method of claim 6, wherein the expression is requested from the first server.

9. The method of claim 8, wherein the allocation record further includes:
   an expression name;
   a lifetime in which the allocation record is valid;
   a record of the second server comprising a set of expressions delegated by the first server, an identifier of the first server, a lifetime of the set of expressions, and information related to a certificate of the second server; and
   information related to a certificate of the first server.

10. A method of operating a first server, comprising:
    receiving a device identifier from a wireless device;
    generating an allocation record that includes an expression used for discovery and for identifying an application on the wireless device, the device identifier, and at least one of a digital signature of the first server or a digital signature of a second server that manages the expression; and
    sending the allocation record to the wireless device for verification based on the device identifier included in the allocation record.

11. The method of claim 10, further comprising receiving a request for an expression from the wireless device, wherein the device identifier is received through the received request.

12. The method of claim 11, wherein the request is for a particular expression.

13. The method of claim 10, further comprising receiving an authorization from the second server to allocate the expression on behalf of the second server.

14. The method of claim 10, wherein the allocation record further includes:
    an expression name;
    a lifetime in which the allocation record is valid;
    a record of the second server comprising a set of expressions delegated by the first server, an identifier of the first server, a lifetime of the set of expressions, information related to a certificate of the second server, and a digital signature of the second server; and
    information related to a certificate of the first server.

15. An apparatus for wireless communication, comprising:
    means for providing a first device identifier of the apparatus;
    means for receiving an allocation record that includes an expression used for discovery and for identifying an application on the apparatus, a second device identifier, and at least one of a digital signature of a first server that delegates the expression or a digital signature of a second server that manages the expression; and
    means for verifying the allocation record, wherein the means for verifying the allocation record is configured to verify that the second device identifier is the same as the first device identifier.

16. The apparatus of claim 15, further comprising means for employing the expression after verifying the allocation record.

17. The apparatus of claim 15, further comprising means for refraining from employing the expression if the allocation record cannot be verified.

18. The apparatus of claim 15, wherein the allocation record further comprises a lifetime in which the allocation record is valid, and the means for verifying the allocation record is further configured to:
    verify the digital signatures of the first and second servers that are included in the allocation record;
    verify that the second device identifier is the same as the first device identifier; and
    verify the lifetime is valid given a current time.

19. The apparatus of claim 18, further comprising means for refraining from employing the expression if either of the digital signatures cannot be verified, the second device identifier is different from the first device identifier, or the lifetime is invalid.

20. The apparatus of claim 15, further comprising means for requesting the expression from one of the first server or the second server, the device identifier being provided with the request for the expression.

21. The apparatus of claim 20, wherein the request is for a particular expression.

22. The apparatus of claim 20, wherein the expression is requested from the first server.

23. The apparatus of claim 22, wherein the allocation record further includes:
    an expression name;
    a lifetime in which the allocation record is valid;
    a record of the second server comprising a set of expressions delegated by the first server, an identifier of the first server, a lifetime of the set of expressions, and information related to a certificate of the second server; and
    information related to a certificate of the first server.

24. An apparatus, comprising:
    means for receiving a device identifier from a wireless device;
    means for generating an allocation record that includes an expression used for discovery and for identifying an application on the wireless device, the device identifier, and at least one of a digital signature of the apparatus or a digital signature of a second apparatus that manages the expression; and
    means for sending the allocation record to the wireless device for verification based on the device identifier included in the allocation record.

25. The apparatus of claim 24, further comprising means for receiving a request for an expression from the wireless device, wherein the device identifier is received through the received request.

26. The apparatus of claim 25, wherein the request is for a particular expression.

27. The apparatus of claim 24, further comprising means for receiving an authorization from the second apparatus to allocate the expression on behalf of the second apparatus.

28. The apparatus of claim 24, wherein the allocation record further includes:
    an expression name;
    a lifetime in which the allocation record is valid;
    a record of the second apparatus comprising a set of expressions delegated by the apparatus, an identifier of the apparatus, a lifetime of the set of expressions, information related to a certificate of the second apparatus, and a digital signature of the second apparatus; and
    information related to a certificate of the apparatus.

29. A computer program product for a wireless device, comprising:
    a non-transitory computer-readable medium comprising code for:
    providing a first device identifier of the wireless device;
    receiving an allocation record that includes an expression used for discovery and for identifying an application on the wireless device, a second device identifier, and at least one of a digital signature of a first server that delegates the expression or a digital signature of a second server that manages the expression; and verifying the allocation record by at least verifying that the second device identifier is the same as the first device identifier.

30. The computer program product of claim 29, wherein the computer-readable medium further comprises code for employing the expression after verifying the allocation record.

31. The computer program product of claim 29, wherein the computer-readable medium further comprises code for refraining from employing the expression if the allocation record cannot be verified.

32. The computer program product of claim 29, wherein the allocation record further comprises a lifetime in which the allocation record is valid, and the code for verifying the allocation record comprises code for:

verifying the digital signatures of the first and second servers that are included in the allocation record; and verifying the lifetime is valid given a current time.

33. The computer program product of claim 32, wherein the computer-readable medium further comprises code for refraining from employing the expression if either of the digital signatures cannot be verified, the second device identifier is different from the first device identifier, or the lifetime is invalid.

34. The computer program product of claim 29, wherein the computer-readable medium further comprises code for requesting the expression from one of the first server or the second server, the device identifier being provided with the request for the expression.

35. The computer program product of claim 34, wherein the request is for a particular expression.

36. The computer program product of claim 34, wherein the expression is requested from the first server.

37. The computer program product of claim 36, wherein the allocation record further includes:

an expression name;
a lifetime in which the allocation record is valid;
a record of the second server comprising a set of expressions delegated by the first server, an identifier of the first server, a lifetime of the set of expressions, and information related to a certificate of the second server; and
information related to a certificate of the first server.

38. A computer program product for a first server, comprising:

a non-transitory computer-readable medium comprising code for:
receiving a device identifier from a wireless device;
generating an allocation record that includes an expression used for discovery and for identifying an application on the wireless device, the device identifier, and at least one of a digital signature of the first server or a digital signature of a second server that manages the expression; and
sending the allocation record to the wireless device for verification based on the device identifier included in the allocation record.

39. The computer program product of claim 38, wherein the computer-readable medium further comprises code for receiving a request for an expression from the wireless device, wherein the device identifier is received through the received request.

40. The computer program product of claim 39, wherein the request is for a particular expression.

41. The computer program product of claim 38, wherein the computer-readable medium further comprises code for receiving an authorization from the second server to allocate the expression on behalf of the second server.

42. The computer program product of claim 38, wherein the allocation record further includes:

an expression name;
a lifetime in which the allocation record is valid;
a record of the second server comprising a set of expressions delegated by the first server, an identifier of the first server, a lifetime of the set of expressions, information related to a certificate of the second server, and a digital signature of the second server; and
information related to a certificate of the first server.

43. An apparatus, comprising:

a processing system configured to:
provide a first device identifier of the apparatus;
receive an allocation record that includes an expression used for discovery and for identifying an application on the apparatus, a second device identifier, and at least one of a digital signature of a first server that delegates the expression or a digital signature of a second server that manages the expression; and
verify the allocation record by at least verifying that the second device identifier is the same as the first device identifier.

44. The apparatus of claim 43, wherein the processing system is further configured to employ the expression after verifying the allocation record.

45. The apparatus of claim 43, wherein the processing system is further configured to refrain from employing the expression if the allocation record cannot be verified.

46. The apparatus of claim 43, wherein the allocation record further comprises a lifetime in which the allocation record is valid, and to verify the allocation record, the processing system is configured to:

verify the digital signatures of the first and second servers that are included in the allocation record; and
verify the lifetime is valid given a current time.

47. The apparatus of claim 46, wherein the processing system is further configured to refrain from employing the expression if either of the digital signatures cannot be verified, the second device identifier is different from the first device identifier, or the lifetime is invalid.

48. The apparatus of claim 43, wherein the processing system is further configured to request the expression from one of the first server or the second server, the device identifier being provided with the request for the expression.

49. The apparatus of claim 48, wherein the request is for a particular expression.

50. The apparatus of claim 48, wherein the expression is requested from the first server.

51. The apparatus of claim 50, wherein the allocation record further includes:

an expression name;
a lifetime in which the allocation record is valid;
a record of the second server comprising a set of expressions delegated by the first server, an identifier of the first server, a lifetime of the set of expressions, and information related to a certificate of the second server; and
information related to a certificate of the first server.

52. An apparatus, comprising:

a processing system configured to:
receive a device identifier from a wireless device;

generate an allocation record that includes an expression used for discovery and for identifying an application on the wireless device, the device identifier, and at least one of a digital signature of the apparatus or a digital signature of a second apparatus that manages the expression; and send the allocation record to the wireless device for verification based on the device identifier included in the allocation record.

53. The apparatus of claim 52, wherein the processing system is further configured to receive a request for an expression from the wireless device, wherein the device identifier is received through the received request.

54. The apparatus of claim 53, wherein the request is for a particular expression.

55. The apparatus of claim 52, wherein the processing system is further configured to receive an authorization from the second apparatus to allocate the expression on behalf of the second apparatus.

56. The apparatus of claim 52, wherein the allocation record further includes:
an expression name;
a lifetime in which the allocation record is valid;
a record of the second apparatus comprising a set of expressions delegated by the apparatus, an identifier of the apparatus, a lifetime of the set of expressions, information related to a certificate of the second apparatus, and a digital signature of the second apparatus; and
information related to a certificate of the apparatus.

* * * * *